United States Patent
Takemura et al.

(10) Patent No.: US 8,617,388 B2
(45) Date of Patent: Dec. 31, 2013

(54) SEWAGE REUSE SYSTEM

(75) Inventors: Kiyokazu Takemura, Tokyo (JP); Makoto Onishi, Tokyo (JP); Shinichi Yoshikawa, Tokyo (JP); Masami Ito, Tokyo (JP); Shinjiro Ueda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 773 days.

(21) Appl. No.: 12/731,486

(22) Filed: Mar. 25, 2010

(65) Prior Publication Data
US 2010/0252489 A1 Oct. 7, 2010

(30) Foreign Application Priority Data
Apr. 2, 2009 (JP) ................................. 2009-089880

(51) Int. Cl.
*C02F 9/14* (2006.01)
(52) U.S. Cl.
USPC ............ 210/86; 210/143; 210/175; 210/241; 210/170.08; 210/260; 210/257.1; 210/321.6
(58) Field of Classification Search
USPC ............. 210/86, 241, 143, 321.6, 257.1, 251, 210/184, 175, 295, 170.08, 260
See application file for complete search history.

(56) References Cited

U.S. PATENT DOCUMENTS

| | | | | |
|---|---|---|---|---|
| 2,594,433 | A * | 4/1952 | Hess et al. | 210/149 |
| 6,299,775 | B1 * | 10/2001 | Elston | 210/605 |

FOREIGN PATENT DOCUMENTS

| | | | |
|---|---|---|---|
| CN | 101186416 A | | 5/2008 |
| JP | 2007237087 A | * | 9/2007 |
| JP | 2008-000705 | | 1/2008 |

OTHER PUBLICATIONS

Notification of office action of Appln. No. 201010157695.6 dated Feb. 21, 2013 with English translation.
CN Office Action of Appln. No. 201010157695.6 dated Sep. 24, 2013 with English translation.

* cited by examiner

*Primary Examiner* — Terry Cecil
(74) *Attorney, Agent, or Firm* — Antonelli, Terry, Stout & Kraus, LLP.

(57) ABSTRACT

A sewage reuse system distributes a plurality of reuse water supply sections, each including a water introducing opening formed in a sewer trunk line; a treated sewage tank for storing reuse water; and a water level sensor for measuring a water level of the treated sewage tank, in a demand area of reuse water along the sewer trunk line. The system includes a movable sewage treatment section which moves to any of the plurality of water introducing openings; performs the sewage treatment to generate reuse water; and supplies the generated reuse water to the treated sewage tank, a communication section which transmits the water level data measured by the water level sensor, and a central control section which controls a water storing quantity of the treated sewage tank on the basis of the demand information of reuse water and the water level data.

5 Claims, 4 Drawing Sheets

SEWAGE REUSE SYSTEM

BACKGROUND (a) Field of the Invention

The present invention relates to a sewage reuse system which introduces a part of sewage from a plurality of places along a sewer trunk line; performs a sewage treatment; and supplies reuse water to the neighborhood.

(b) Description of the Related Arts

Conventionally, sewage flowing through a sewer trunk line is treated by a terminal sewage treatment plant in order to generate reuse water. The generated reuse water is supplied to an area on the upstream side. However, the supply of reuse water has become a problem for an area that is far away from the terminal sewage treatment plant but needs water.

Then, in recent years, satellite treatment plant, by which sewage can be effectively treated and reused, is put into use. FIG. 4 is an explaining diagram showing a structure of a plurality of satellite treatment plants. As shown in FIG. 4, there is a sewer trunk line 3. A terminal sewage treatment plant 2 is arranged at the end of the sewer trunk line 3, and a plurality of satellite treatment plants 1 are distributed along the sewer trunk line 3. Each satellite treatment plant 1 introduces a part of sewage flowing through the sewer trunk line 3; purifies the sewage in order to generate reuse water; then supplies the generated reuse water to an area that is in the neighborhood of the satellite treatment plant 1 and is in demand for reuse water.

However, because such conventional satellite treatment plant is often located in an urban district where it is difficult to secure ample setting space, it has become a problem to miniaturize the setting space as much as possible.

As disclosed in the Japanese Patent Publication No. 2008-705, the present applicant once proposed a sewage treatment apparatus used in such satellite treatment plant. The Japanese Patent Publication No. 2008-705 describes a sewage treatment apparatus which performs a sewage treatment through combining a high-rate filtering means with a membrane separation active-sludge treating means.

According to the sewage treatment apparatus disclosed in the Japanese Patent Publication No. 2008-705, it is possible to miniaturize the setting space of the whole treatment apparatus, as well as to generate reuse water with high purity.

However, it is necessary to generate reuse water according to the demand of the neighborhood. Furthermore, it is also necessary to prepare water tanks for temporarily storing the generated reuse water according to different purities. Because of that, there is an important project to generate reuse water and control water storing quantity of reuse water according to the demand for reuse water, but this project has not been considered in the Japanese Patent Publication No. 2008-705 mentioned above.

SUMMARY OF THE INVENTION

Therefore, in order to accomplish the project mentioned above, the present invention aims to control the water storing quantity of reuse water which is generated by a sewage treatment apparatus of a satellite treatment plant. Furthermore, the present invention also aims to control and adjust water storing quantities in a plurality of sewage treatment apparatuses by a unified management.

An aspect of the invention is to provide a sewage reuse system, which distributes a plurality of reuse water supply sections, each includes a water introducing opening formed in a sewer trunk line; a treated sewage tank for storing reuse water that has been generated through a sewage treatment; and a water level sensor for measuring a water level of the treated sewage tank, in a demand area of reuse water along the sewer trunk line, comprising: a movable sewage treatment section which moves to any of the plurality of water introducing openings, performs the sewage treatment to generate reuse water, and supplies the generated reuse water to the treated sewage tank; a communication section which transmits the water level data measured by the water level sensor; and a central control section which controls a water storing quantity of the treated sewage tank on the basis of the demand information of reuse water and the water level data received from the communication section.

As a result, the central control section can move the sewage treatment section to one of the reuse water supply sections, which is located in a demand area of reuse water, on the basis of the demand information of reuse water.

Further, the sewage treatment section includes: a water introducing portion which is connected to the water introducing opening in order to introduce a part of sewage; a membrane separation active-sludge portion which performs a biological treatment on the sewage in order to generate a first treated sewage; and a membrane highly treating portion which performs a membrane high treatment on the first treated sewage in order to generate a second treated sewage.

Further, the treated sewage tank consists of: a membrane treating tank which stores the first treated sewage; and a membrane highly treating tank which stores the second treated sewage.

Further, the reuse water supply section includes a draining opening which drains a concentration liquid produced by the membrane highly treating portion or/and a surplus sludge produced by the membrane separation active-sludge portion back to the sewer trunk line downstream from the water introducing opening.

Further, the sewage treatment section further includes a power supply which supplies the membrane separation active-sludge portion and membrane highly treating tank with electricity, and a heating part which makes use of waste heat released from the power supply to heat the membrane separation active-sludge portion.

According to such sewage reuse system of the present invention, on the basis of the demand information of reuse water, the temperature, and the water level data, it is possible to generate reuse water through the movable sewage treatment section, and control water storing quantities of a plurality of treated sewage tanks by a unified management.

Further, it is also possible to control the water storing quantity of the treated sewage tank by moving the sewage treatment section to a demand area of reuse water in order to perform the sewage treatment and supply the treated sewage tank with reuse water, according to the demand for reuse water. As a result, there is no need to install a plurality of sewage treating devices all over the demand area of reuse water.

Further, it is also possible to generate and store reuse water with different purities, according to the demand information of reuse water.

Further, it is also possible to drain the surplus sludge produced by the membrane separation active-sludge portion or/and the concentration liquid produced by the membrane highly treating portion back to the sewer trunk line via the draining opening which is formed downstream from the water introducing opening. As a result, there is no need to install other treating device in additional for treating the surplus sludge or/and the concentration liquid, so that the setting space of the whole apparatus of the sewage treatment section 40 can be miniaturized.

Further, because the waste heat released from the power supply is collected and used for heating the membrane separation active-sludge portion, it is possible to raise the efficiency of the biological treatment by adjusting the temperature to a suitable temperature.

DETAILED DESCRIPTION OF THE INVENTION

Embodiments of the present invention will be described in detail hereinbelow with reference to the drawings.

Figure 1:
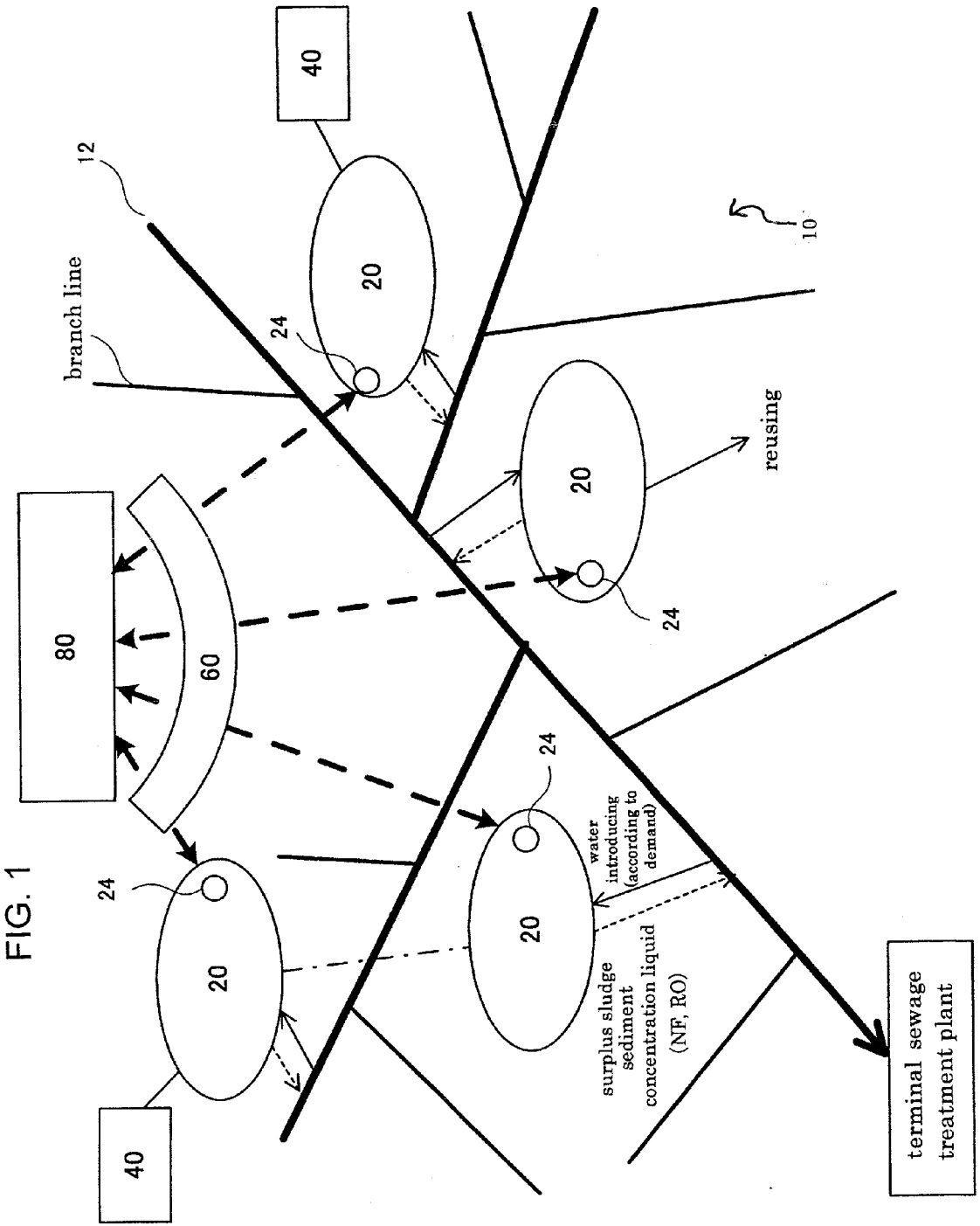
FIG. 1 is a summary diagram showing a structure of a sewage reuse system of the present invention.
Figure 2:
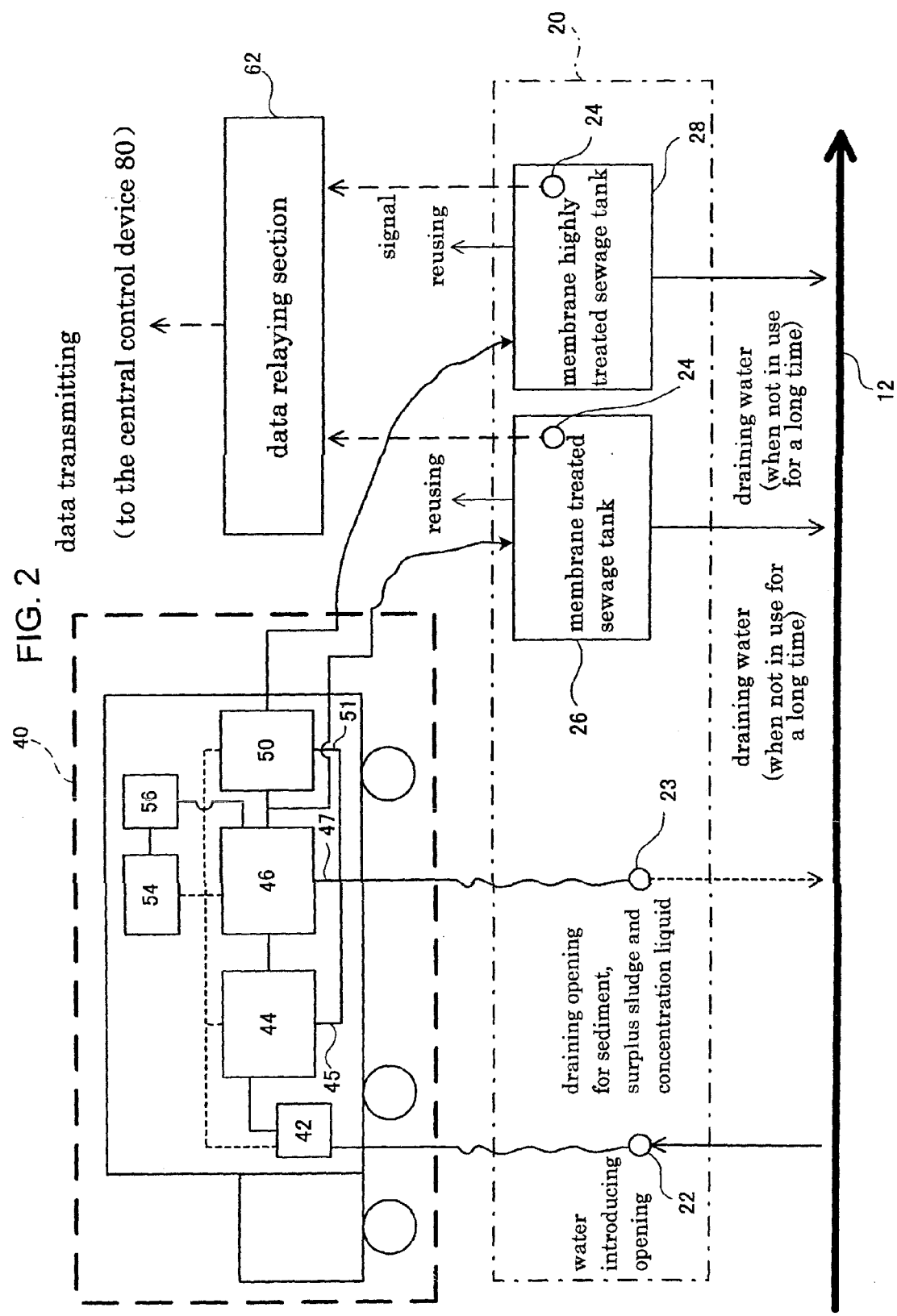
FIG. 2 is an explaining diagram of a reuse water supply section and a sewage treatment section.
Figure 3:
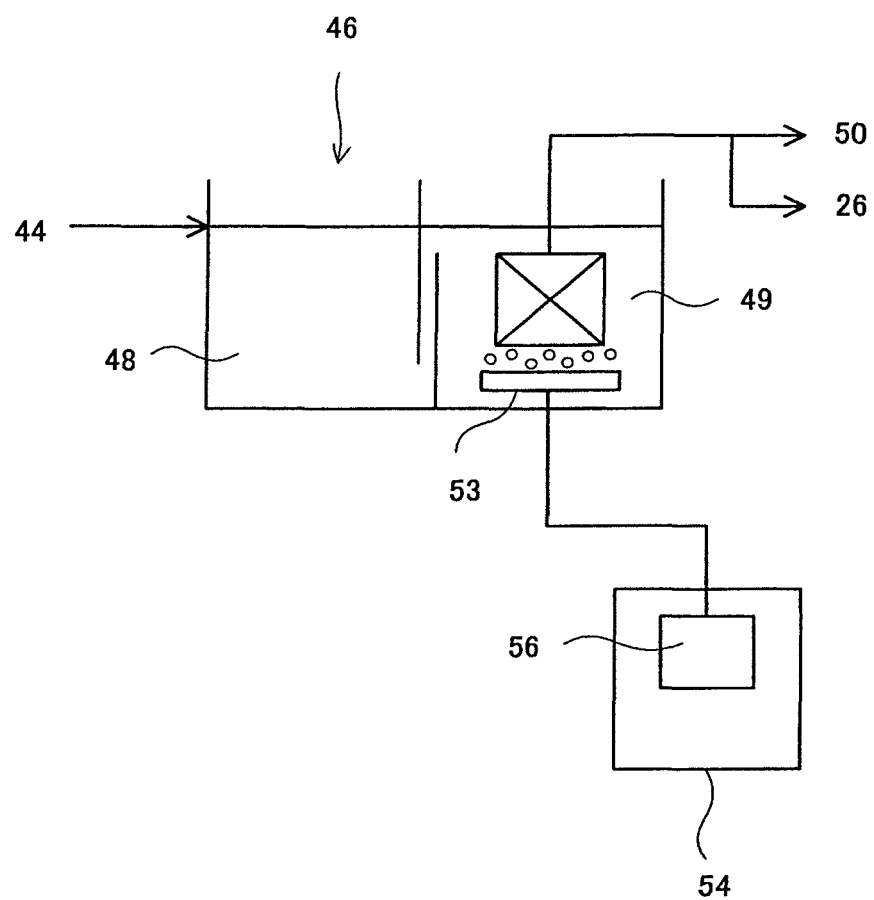
FIG. 3 is an explaining diagram of a sewage treatment section reusing waste heat.
Figure 4:
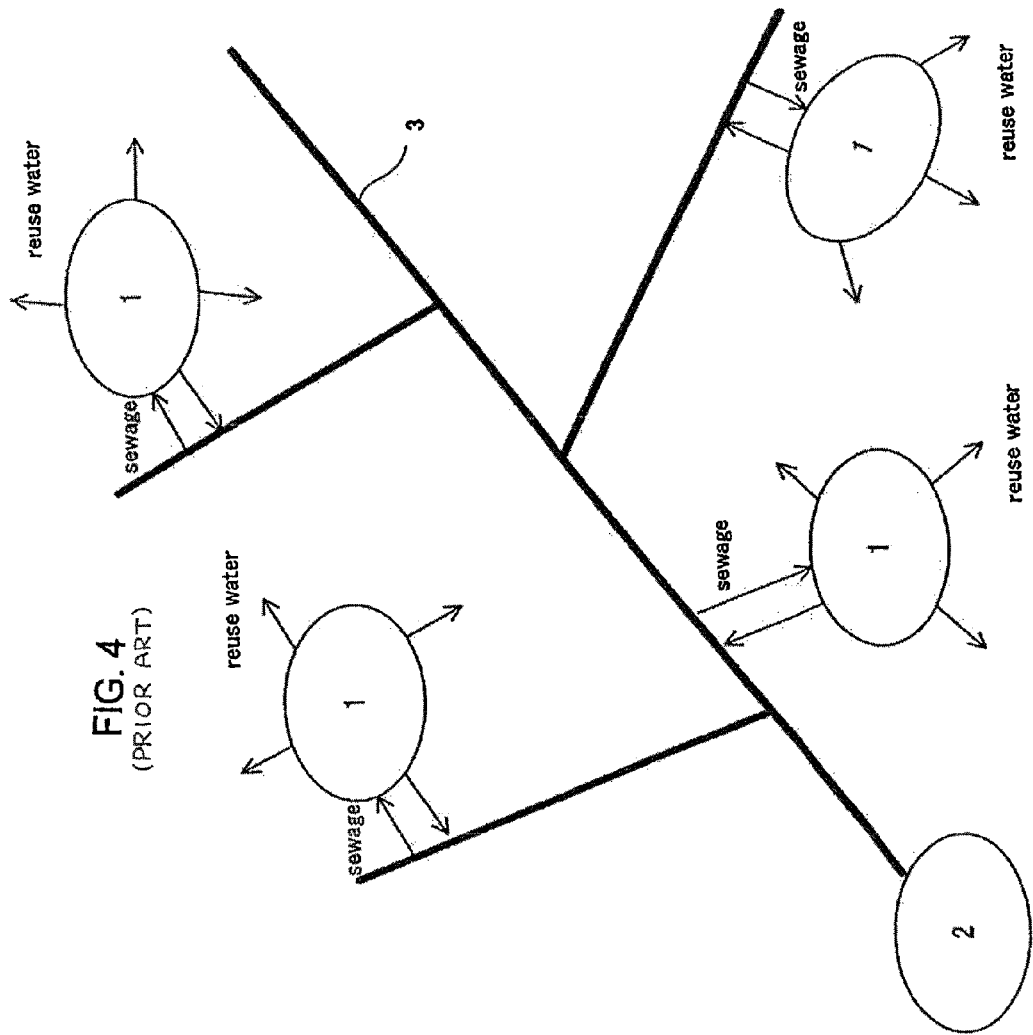
FIG. 4 is an explaining diagram showing a structure of a plurality of satellite treatment plants in prior art.

FIG. 1 is a summary diagram showing a structure of a sewage reuse system of the present invention. FIG. 2 is an explaining diagram of a reuse water supply section and a sewage treatment section. FIG. 3 is an explaining diagram of a sewage treatment section reusing waste heat.

The sewage reuse system 10 of the present invention mainly comprises a plurality of reuse water supply sections 20, one or more sewage treatment sections 40, a communication section 60, and a central control section 80.

The plurality of reuse water supply sections 20 are distributed along a sewer trunk line 3, and each reuse water supply section 20 consists of a water introducing opening 22 formed in the sewer trunk line 12, a treated sewage tank for storing reuse water that is generated through a sewage treatment, and a water level sensor for measuring the water level of the treated sewage tank.

Furthermore, reuse water can be used as, for example, environment water in parks, water for melting snow, toilet water, sprinkling water, gardening water, domestic water in emergency and so on.

The treated sewage tank which is an attachment to the water introducing opening 22 consists of at least 2 tanks, and is used for storing reuse water with different purities respectively, according to the demand for reuse water. As an example, the treated sewage tank of the present embodiment consists of a membrane treated sewage tank 26 and a membrane highly treated sewage tank 28 (as shown in FIG. 2).

The membrane treated sewage tank 26 is used for storing the reuse water (i.e. first treated sewage) that has been treated through a biological treatment performed by an aftermentioned membrane separation active-sludge portion 46 comprised in the sewage treatment section 40. The membrane treated sewage tank 26 comprises a supply pipe and a draining pipe. The supply pipe supplies the reuse water to an area where reuse water is in demand, and the draining pipe drains the reuse water stored in the tank back to the sewer trunk line 12.

The membrane highly treated sewage tank 28 is used for storing the reuse water (i.e. second treated sewage) that has been treated through a membrane separation treatment performed by an aftermentioned membrane highly treating portion 50 comprised in the sewage treatment section 40. The membrane highly treated sewage tank 28 comprises a supply pipe and a draining pipe. The supply pipe supplies the reuse water to an area where reuse water is in demand, and the draining pipe drains the reuse water stored in the tank back to the sewer trunk line 12.

For measuring the water level (water storing quantity) of reuse water, water level sensors 24 are installed in both the membrane treated sewage tank 26 and the membrane highly treated sewage tank 28.

Each reuse water supply section 20 further comprises a draining opening 23 which is used for draining "sediment", surplus sludge, and concentration liquid that will be referred afterwards back to the sewer trunk line 12. The draining opening 23 is formed in the sewer trunk line 12 downstream from the water introducing opening 22.

The sewage treatment section 40 mainly comprises a water introducing portion 42, a pretreating portion 44, a membrane separation active-sludge portion 46, a membrane highly treating portion 50, and a power supply 54. The sewage treatment section 40 can be mounted in a vehicle to move from one reuse water supply section 20 to another.

The water introducing portion 42 is connected to the water introducing opening 22 formed in the sewer trunk line 12, and supplies a part of sewage to the pretreating portion 44 which will be referred afterwards. The introducing portion 42 is formed, for example, by an electromagnetic valve or a suction pump.

The pretreating portion 44 is used for removing "sediment" from the sewage through a pretreatment before a sewage treatment which will be performed afterwards. For example, fiber filtering material, screen and other materials can be used as the pretreating portion 44. In details, the pretreating portion 44 separates and removes floating trash included in the sewage as "sediment", by letting the sewage flow through the fiber filtering material or the screen. The pretreating portion 44 comprises a draining pipe 45 which drains the "sediment" collected during the process of the pretreatment back to the sewer trunk line 12. The draining pipe 45 is connected to the draining opening 23 which is formed in the sewer trunk line 12 downstream from the water introducing opening 22. The drained "sediment" will be treated by a terminal sewage treatment plant arranged at the end of the sewer trunk line 12.

The membrane separation active-sludge portion 46 mainly comprises an anaerobic tank 48 and an aerobic tank 49. The anaerobic tank 48 is located in the upstream side, and the aerobic tank 49 is located next to the anaerobic tank 48 in the downstream side. The sewage is introduced from the pretreating portion 44 into the anaerobic tank 48, and the anaerobic tank 48 performs a biological treatment through active-sludge in order to generate treated sewage (i.e. the first treated sewage). Then, the first treated sewage is introduced into the aerobic tank 49, and the aerobic tank 49 performs a membrane separation through flat membrane soaked in the tank in order to separate the active-sludge from the first treated sewage. Afterwards, the first treated sewage is introduced to the membrane highly treating portion 50 or the membrane treated sewage tank 26 which will be referred afterwards. In the membrane separation active-sludge portion 46, surplus sludge is produced as a result of the growth of the active-sludge during the process of the biological treatment. The membrane separation active-sludge portion 46 comprises a draining pipe 47 which drains the surplus sludge back to the sewer trunk line 12. The draining pipe 47 is connected to the draining opening 23 which is formed in the sewer trunk line 12 downstream from the water introducing opening 22. The drained surplus sludge will be treated by a terminal sewage treatment plant. Further, although as an example, the aerobic tank 49 of the present embodiment has been described as using flat membrane as a separation method, any other hollow thread membrane can also be used and the material of the membrane is not restrict as long as the active-sludge can be separated from the first treated sewage.

The membrane highly treating portion 50 is used for generating reuse water with high purity according to different uses of the reuse water. For example, reverse osmosis membrane (RO) and/or Nan filtration membrane (NF) can be used in the membrane highly treating portion 50. The reverse osmosis membrane (RO) or the Nan filtration membrane (NF) is fixed in the flow path of the first treated sewage, so that it is possible to purify the first treated sewage by letting it flow through the membrane. The reverse osmosis membrane can remove inorganic molecules from the first treated sewage to generate treated sewage (i.e. second treated sewage) that has the same purity as drinking water. Comparatively, the Nan filtration membrane can remove pigment components from the first treated sewage to generate second treated sewage that is transparent. In the membrane highly treating portion 50, during the process of the membrane treatment, concentration liquid is produced as an incidental product besides the generation of reuse water. The membrane highly treating portion 50 comprises a draining pipe 51 to drain the concentration liquid back to the sewer trunk line 12. The draining pipe 51 is connected to the draining opening 23 which is formed in the sewer trunk line 12 downstream from the water introducing opening 22. The drained concentration liquid will be treated by a terminal sewage treatment plant.

As shown in FIG. 2, the power supply 54 supplies electric power to the water introducing portion 42, the pretreating portion 44, the membrane separation active-sludge portion 46, and the membrane highly treating portion 50. For example, a fuel cell, or a family use generator such as a solar power source or a wind power source can be used as the power supply 54.

Furthermore, the power supply 54 comprises a waste heat collecting part 56. The power supply 54 releases heat in the course of generating electricity. In the present invention, the released heat (i.e. waste heat) is collected by the waste heat collecting part 56, and is used in the sewage treatment.

As shown in FIG. 3, the waste heat collecting part 56 collects the waste heat released from the generator of the power supply 54 and temporarily stores it in a heat accumulating device. The waste heat collecting part 56 is connected with a plurality of heating parts. An embodiment of the heating part has a structure described below. The waste heat collecting part 56 is connected with a dispersing part 53 which is mounted in the aerobic tank 49 of the membrane separation active-sludge portion 46. The dispersing part 53 bubbles hot air into the aerobic tank 49 so that the sewage which is being treated in the aerobic tank 49 can be heated to a proper temperature for biological treatment. As a result, the efficiency of the biological treatment performed through the active-sludge can be raised accordingly. Otherwise, the heating method of the heating part is not limit to the dispersing part 53 as long as the treated sewage and the reuse water can be heated.

Furthermore, because the "sediment" that is newly produced by the sewage treatment section 40, the surplus sludge, and the concentration liquid are all drained back to the sewer trunk line 12 downstream from the water introducing opening, there is no need to install extra treating device. As a result, the setting space of the whole apparatus of the sewage treatment section 40 can be miniaturized.

Each water level sensor 24 comprises a data sending source, and the central control section 80 which will be referred afterwards comprises a data receiving source. The communication section 60 is a wired or wireless network which connects all the data sending sources with the data receiving source. As an example, there are a plurality of relay stations distributed among the communication section 60 according to the distance between those data sending sources and the data receiving source, and a wireless network system, such as a mobile system or a Wireless LAN, is used as the means of communication of the communication section 60. As another example, the communication section 60 comprises a data relaying portion 62, which collects the water level data of the treated sewage tank in the reuse water supply section 20 and performs necessary data processing for data transmission.

The data transmitted from the data sending source of the water level sensor 24 is the water storing quantity (water level data) of the membrane treated sewage tank 26 and the membrane highly treated sewage tank 28.

The central control section 80 mainly comprises a wireless receiver, a data processing unit, and a monitor, and controls driving states of the treated sewage tank by a unified management. Specifically, the central control section 80 receives data of driving state from each treated sewage tank via the wireless receiver. Further, the demand information of reuse water and the weather information in the neighborhood of the satellite treatment plant are inputted into the data processing unit of the central control section 80. On the basis of such information, the central control section 80 controls and adjusts the water storing quantity of each treated sewage tank.

The sewage reuse system 10, which has the structure described above, works in the following way. The water level data of the membrane treating tanks 26 and the membrane highly treating tanks 28 located in each water supply sections 20 is measured by a couple of water level sensor 24, then is transmitted to the central control section 80 via the communication section 60. Although in this embodiment, the water level data is transmitted directly to the central control section 80 via the communication section 60, the water level data can also be transmitted first to the data relaying portion 62 and be temporarily remembered there. In the second case, after the data relaying portion 62 performs a data processing which is necessary for data transmission, the water level data is transmitted to the central control section 80 via the communication section 60.

The communication section 60 works in the following way. Firstly, the data sending source sends data to all relay stations that are in reach. Then each of the relay stations forwards the received data to other relay stations that are in reach. By repeating the step described above, the data can be transmitted to the data receiving source of the central control section 80.

The demand information of reuse water in the neighborhood of the reuse water supply section 20 and the weather information are inputted into the central control section 80. When the water storing quantity of a treated sewage tank, which is located in a demand area of reuse water, is insufficient according to the demand information of reuse water, the central control section 80 controls the sewage treatment section 40 to perform the sewage treatment in order to increasing the water introducing quantity of the treated sewage tank to a desired quantity.

The sewage treatment section 40 works in the following way. Sewage is introduced from the sewer trunk line 12 into the pretreating portion 44 through the water introducing portion 42. The pretreating portion 44 separates and removes the "sediment" included in the sewage in order to reduce the burden of the membranes treatment performed in the membrane separation active-sludge portion 46 afterwards. The collected "sediment" is drained via the draining pipe 45 to the draining opening 23 formed in the sewer trunk line 12 downstream from the water introducing opening 22. The sewage that has been treated by the pretreating portion 44 is introduced into the membrane separation active-sludge portion 46.

The membrane separation active-sludge portion 46 performs the biological treatment to generate the first treated sewage through the active-sludge that has been adjusted to a required concentration in the anaerobic tank 48 located in the forepart of the membrane separation active-sludge portion 46. Then, the sewage that has been treated by the active-sludge is introduced into the aerobic tank 49 located next to the anaerobic tank 48, and is separated from the active-sludge by flat membrane soaked in the aerobic tank 49. The surplus sludge, which is produced as a result of the growth of the active-sludge during the process of the biological treatment, is drained back to the sewer trunk line 12 via the draining pipe 47. A part of the first treated sewage is introduced into the membrane highly treating portion 50, while the remaining is introduced into the membrane treating tank 26 and temporarily stored there as reuse water before using.

In the membrane highly treating portion 50, to generate the second treated sewage with a purity higher than that of the first treated sewage, the reverse osmosis membrane and/or the Nan filtration membrane is put into use according to different uses of reuse water. The second treated sewage, which is generated through the purification treatment, is introduced into the membrane highly treating tank 28 and temporarily stored there as reuse water before using. Such reuse water has a purity higher than that of the first treated sewage generated through the active-sludge.

Moreover, the power supply 54 supplies the water introducing portion 42, the pretreating portion 44, the membrane separation active-sludge portion 46, and the membrane highly treating portion 50 with electricity. The waste heat released from the generator is collected and stored by the waste heat collecting part 56. Further, the waste heat collecting part 56 is connected with the dispersing part 53 mounted in the aerobic tank 49 of the membrane separation active-sludge portion 46, and the dispersing part 53 bubbles hot air into the aerobic tank 49. As a result, the sewage which is being treated in the aerobic tank 49 can be heated to a proper temperature for biological treatment.

When the water storing quantity of a treated sewage tank, which is located in a demand area of reuse water, is insufficient according to the demand information of reuse water, the central control section 80 moves a movable sewage treatment section 40, for example a vehicle with a sewage treating device mounted on, to the demand area of reuse water; connects the water introducing portion 42 to the water introducing opening 22 of the reuse water supply section 20 located in this area; and lets the sewage treatment section 40 perform the sewage treatment to generate reuse water. Then the generated reuse water is supplied to the treated sewage tank attached to the water introducing opening 22, and is stored there.

Moreover, the central control section 80 is able to control and adjust the water storing quantity on the basis of the use history of reuse water.

When the water storing quantity of a treated sewage tank, which is located in a demand area of reuse water, is considered to be insufficient on the basis of the use state of reuse water or the weather information, the central control section 80 moves the sewage treatment section 40; lets it work to generates reuse water; and stores the reuse water in the treated sewage tank.

Moreover, the central control section 80 is also able to moves the sewage treatment section 40 to a demand area of reuse water, in order to generate and store reuse water on the basis of a demand forecasting which can be predicted on the basis of the yearly use history of reuse water or the weather information.

With such sewage reuse system, it is possible to control water storing quantities of a plurality of treated sewage tanks by a unified management; and adjust the water storing quantity of the reuse water generated by the sewage treatment section 40 according to the demand for reuse water. It is also possible to control the water storing quantity of the treated sewage tank by moving the sewage treatment section 40 to a demand area of reuse water to generated reuse water according to the demand information of reuse water and the weather information. As a result, there is no need to install a plurality of sewage treating devices all over the demand area of reuse water.

What is claimed is:

1. A sewage reuse system, which distributes a plurality of reuse water supply sections, each of which includes a water introducing opening formed in a sewer trunk line; a treated sewage tank for storing reuse water that has been generated through a sewage treatment; and a water level sensor for measuring a water level of said treated sewage tank, in a demand area of reuse water along said sewer trunk line, comprising:
   a movable sewage treatment section which moves to any of said plurality of water introducing openings, performs said sewage treatment to generate reuse water, and supplies the generated reuse water to said treated sewage tank;
   a communication section which transmits said water level data measured by said water level sensor; and
   a central control section which controls a water storing quantity of each of said treated sewage tanks by moving said movable sewage treatment section to one of said reuse water supply sections which is located in a demand area of reuse water on the basis of the demand information of reuse water and said water level data received from said communication section.

2. The sewage reuse system according to claim 1, wherein said movable sewage treatment section includes:
   a water introducing portion which is connected to said water introducing opening in order to introduce a part of sewage;
   a membrane separation active-sludge portion which performs a biological treatment on said sewage in order to generate a first treated sewage; and
   a membrane highly treating portion which performs a membrane high treatment on said first treated sewage in order to generate a second treated sewage.

3. The sewage reuse system according to claim 2, wherein said reuse water supply section includes a draining opening which drains a concentration liquid produced by said membrane highly treating portion or/and a surplus sludge produced by said membrane separation active-sludge portion back to said sewer trunk line downstream from said water introducing opening.

4. The sewage reuse system according to claim 2, wherein said movable sewage treatment section further includes:
   a power supply which supplies said membrane separation active-sludge portion and membrane highly treating tank with electricity, and
   a heating part which makes use of waste heat released from said power supply to heat said membrane separation active-sludge portion.

5. The sewage reuse system according to claim 1, wherein each of said treated sewage tanks consists of:
- a membrane treating tank which stores said first treated sewage; and
- a membrane highly treating tank which stores said second treated sewage.

\* \* \* \* \*